(12) United States Patent
Gröhbühl (10) Patent No.: US 11,796,551 B2
(45) Date of Patent: Oct. 24, 2023

(54) CENTRALIZED TERMINAL

(71) Applicant: STRATEC SE, Birkenfeld (DE)

(72) Inventor: Bernd Gröhbühl, Birkenfeld (DE)

(73) Assignee: STRATEC SE, Birkenfeld (DE)

( * ) Notice: Subject to any disclaimer, the term of this patent is extended or adjusted under 35 U.S.C. 154(b) by 215 days.

(21) Appl. No.: 17/119,105

(22) Filed: Dec. 11, 2020

(65) Prior Publication Data

US 2021/0181220 A1 Jun. 17, 2021

(30) Foreign Application Priority Data

Dec. 17, 2019 (LU) .................................. 101562

(51) Int. Cl.
  *G01N 35/04* (2006.01)
  *G01N 35/00* (2006.01)
  *G01N 35/02* (2006.01)

(52) U.S. Cl.
  CPC ......... *G01N 35/04* (2013.01); *G01N 35/0099* (2013.01); *G01N 35/00594* (2013.01); *G01N 35/00732* (2013.01); *G01N 35/026* (2013.01); *G01N 2035/00752* (2013.01); *G01N 2035/00891* (2013.01); *G01N 2035/0415* (2013.01)

(58) Field of Classification Search
  CPC ............ G01N 35/04; G01N 35/00594; G01N 35/00732; G01N 35/0099; G01N 35/026; G01N 2035/00752; G01N 2035/00891; G01N 2035/0415; G01N 2035/00435; G01N 2035/0412; G01N 2035/0465; G01N 2035/0467; G01N 2035/0424; G01N 2035/0413; B65G 2201/0244; B65G 2201/0261; B65G 2203/041; B65G 65/00

See application file for complete search history.

(56) References Cited

U.S. PATENT DOCUMENTS

| 6,293,750 B1 | 9/2001 | Cohen et al. | |
| 2015/0204598 A1* | 7/2015 | Affleck | ................... B65B 3/003 220/560.04 |

FOREIGN PATENT DOCUMENTS

WO 2017184242 A2 10/2017

* cited by examiner

*Primary Examiner* — Jill A Warden
*Assistant Examiner* — John McGuirk
(74) *Attorney, Agent, or Firm* — 24IP LAW GROUP USA, PLLC; Timothy DeWitt (57) ABSTRACT

Clusters of multiple diagnostic analyzers, as well as, alternatively, to one single analyzer that consists of multiple parallel cores (basic analyzer modules) to provide a scalable and user-friendly system architecture. The invention provides a terminal for loading, identifying and hosting samples and/or consumables to at least two automated analyzer systems, the system comprising a distribution robot with four linear drives and a rotational drive, wherein a first linear drive comprises a sledge that can only move linear and horizontally on a rail; the rotational drive comprises a platform that can rotate around the sledge; a second linear drive comprises a carrier that can only move linear and horizontally on the platform; a third linear drive comprises a hook that can only move linear and horizontally on the carrier; and a fourth linear drive comprises a drive for vertically moving the platform over the sledge.

13 Claims, 6 Drawing Sheets

CENTRALIZED TERMINAL

CROSS-REFERENCE TO RELATED APPLICATIONS

The present application claims priority of United Kingdom Application No. GB 1616034.3 filed on Sep. 21, 2016. The aforementioned application is hereby incorporated by reference in its entirety.

BACKGROUND OF THE INVENTION

Field of the Invention

The invention relates to clusters of multiple diagnostic analyzers, as well as, alternatively, to one single analyzer that consists of multiple parallel cores (basic analyzer modules) to provide a scalable and user-friendly system architecture.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

Automated analyzer systems are widely used for performing assays in the area of in vitro diagnostics (IVD). Such analyzer systems face a wide range of throughput requests, depending on the use cases and the environment (laboratory) of the individual installation.

Different throughput requirements are usually addressed by designing a group or family of analyzers (two or three) with little technological variations to facilitate the desired hi-, mid- or low-throughput needs. Even smaller variations may cause varying test results, because such variations may influence relevant devices like incubators, washer modules etc. of automated analyzer systems.

One strategy to avoid varying conditions is to design and build only low-throughput systems and to install work-cells of them to address higher throughput or use multiple identical core devices for adapting to various throughput needs.

For both scenarios, it is beneficial to have a scalable user interface for loading and unloading of patient samples, reagents, consumables and/or other bulk articles. Though individual centralized loading devices for e.g. patient samples or consumables have been designed and built at STRATEC® SE, there is so far no generic design approach for such an interface or terminal.

Generic and scalable solutions available in the IVD market address sample loading and sample preparation but do not refer to supply needs as described above. Providing analyzer families to support identical applications in different throughput scales is correlated to disadvantages like high cost for designs, manufacturing and servicing of a complete group or family of analyzer systems. Probably a negative reliability impact may be related to different automated analyzer designs. multi-analyzer-families or groups solution may be later marketed because of higher efforts in designing, manufacturing and verification/validation regarding their improved reliability. Finally, higher costs and lower flexibility may result, when existing laboratory equipment shall be connected and configured to a work-cell or cluster.

Published International Patent Application No. WO 2017/184242 A2 describes an automated analyzer that receives samples prepared for analysis in an automated pre-analytical module that is either separate from, adjacent to or integrated with the automated analyzer and a method of operation of such automated analyzer. The automated analyzer includes a shuttle transfer station that receives a shuttle carrier from the automated pre-analytical system. The shuttles carry containers with samples that were pre-processed by the pre-analytical system disposed therein. The shuttle transfer station has a clamping assembly for the shuttle. The clamping assembly has jaws that advance engagement members into contact with the bottom portion of the sample containers disposed in the shuttle. The clamping, assembly, when closed, secures the sample containers in the shuttle when sample is aspirated from the sample containers using a robotic pipettor. The automated analyzer also has a multichannel puncture tool that is adapted to be carried by a robotic gripper mechanism. The multichannel puncture tool has multiple puncture members that each defines a channel. When the puncture tool punctures the lid of a multi-trough consumable, each channel is in communication with a different trough in the consumable. A pipette can pass through the channel in the puncture tool to aspirated contents from or dispense contents into the respective trough with which the channel is in communication. A disadvantage of the device described in this document is that the shuttle requires a large three-dimensional space for moving consumables.

Published U.S. Pat. No. 6,293,750 B1 teaches a robotic arm has a pair of gripper fingers designed to grip a variety of containers, including capped and uncapped test tubes as well as containers having unique gripping means. The fingers each have upper and lower projections separated by a groove, the respective projections facing each other when mounted to grippers on the robotic arm. The projections and groove serve to firmly hold the containers as well as self-align the unique gripping means on initially unaligned containers within the fingers as the fingers close around the containers. The fingers have clearance to avoid contact with caps on capped test tubes. Stops are provided at the top of each finger to engage one another and prevent fully closed fingers from deforming. The robotic arm may be transported along a rail mounted above the instrument and a gripper assembly, having a gripper arm, mounted to the robotic arm may be rotated above the instrument to move the container to various locations within the instrument. Side posts on the instruments have a gap between them that permits the gripper arm to rotate and extend outwards to interface with an adjacent instrument or a lab automation transport line. Disadvantages of the disclosed robotic relate to the large three-dimensional space that the robotic arm requires for moving and the complete set-up of a gripper arrangement.

SUMMARY OF THE INVENTION

It is therefore the object of this invention to provide an improved generic approach of a terminal device with a user interface for loading/unloading, identifying, taking-up and storing reagents, consumables and the like to multiple diagnostic analyzer systems.

The present invention provides a system for loading, identifying and hosting samples and/or consumables to at least two automated analyzer systems, the system comprising at least one tray for accommodating sample containers and a terminal for moving racks comprising a distribution robot with four linear drives and a rotational drive, wherein a sledge that can only move linearly and horizontally is arranged onto a rail of a first linear drive; a platform that can rotate around the sledge is arranged horizontally onto the rotational drive; a carrier that can only move linearly and horizontally on the platform is connected to a second linear drive; a hook that can only move linearly and horizontally on the carrier is connected to a third linear drive; and a drive for vertically moving the platform above the sledge is connected to a fourth linear drive.

The system according to the invention may in a further aspect comprise a loading and unloading area for single and multiple items.

The system may in another embodiment comprise at least one protective cover for covering movable parts.

It is further envisaged that the system according to the invention may comprise an input device and a display, wherein the display may also be the input device, e.g., a touchscreen.

In a further aspect of the invention, the system may comprise storage positions for racks.

A tray of a system according to the present invention may further have rows for accommodating racks in parallel, wherein a tray may have up to 20 rows.

It is further envisaged that a rack of a system according to the present invention may have recesses for accommodating up to five containers.

The system may have in a further embodiment a scanner for reading label or barcodes applied to a container and/or rack, wherein the scanner can be a camera.

The system may in a further aspect comprise a data processing unit with an image analysis software for monitoring container processing after loading.

In another aspect, the system according to the present invention may comprise a storage for reagents wherein the storage can be cooled by a cooling device that is part of the system or a separate device.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF SUMMARY OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The technical problem is solved by the independent claims. The dependent claims cover further specific embodiments of the invention.

The invention focuses on a generic design approach of a terminal device with a user interface for loading, identifying and hosting patient samples and/or reagents, consumables etc. to multiple (at least two) automated (diagnostic) analyzer systems or analyzer cores within the meaning of cores that may be surrounded by peripheral devices.

The present invention describes a design for providing patient samples via five position sample racks to a cluster of automated analyzers or analyzer cores. The present invention may further provide interfaces to external components like a LAS (Lab Automation System), a rack builder, a centrifuge, a reagent fridge or the like.

Within the meaning of the present invention, the handling and storage of the exemplary racks is shown on one upper deck level of the terminal. This is only one possible embodiment of the overall concept and a skilled person will realize that the invention is not limited to the described embodiment.

A container within the meaning of the present invention refers to a bottle, test bottle, flask, vessel, bin, bowl, tank or any other receptacle suitable for storing liquids that may comprise particles or solids. A liquid comprises patient samples, e.g. body liquids like whole blood, plasma, urine or any other liquid sample that has been taken from a human or animal body. Further liquids may be buffer or liquids comprising nucleotides, amino acids, peptides or chemicals in solution.

In particular, the invention relates to an interface terminal comprising hardware and software that offers lab staff a centralized area to load and unload patient samples, reagents, consumables and/or other bulk materials. Beyond the means for loading and unloading, the terminal device itself may contain means to identify, store and host as well as manipulate and rearrange loaded items.

Figure 1:
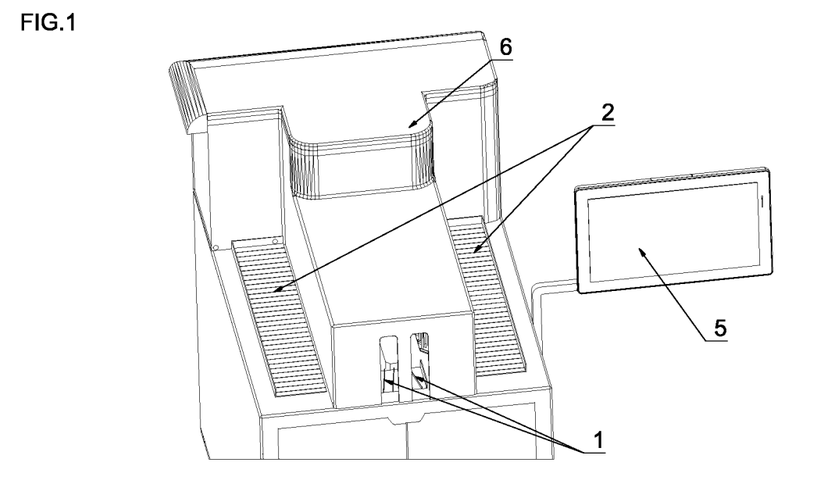
FIG. 1 shows an exemplary design with loading and unloading areas for single and multiple items.

The present invention is based on the exemplary design shown in FIG. 1 with loading/unloading areas for single land multiple items 2. Multiple items can be loaded/unloaded at a time via trays 30 or carriers for the ease of use. Whether a position supports loading and/or unloading may be defined by an administrator or user and may be adapted to the respective need. The illustrated design in FIG. 1 allows for unrestricted user access to these areas.

As an alternative, user access can also be protected by protective covers 6 to strictly separate user and machine interaction. A user would then need request for accessing covered parts of the device via the graphical user interface on the monitor 5.

The user interface monitor 5 allows for configuration and interaction during use of the system. Protective covers 6 shield the areas where only the system's internal robotic handling is taking place (FIG. 1).

Figure 2:
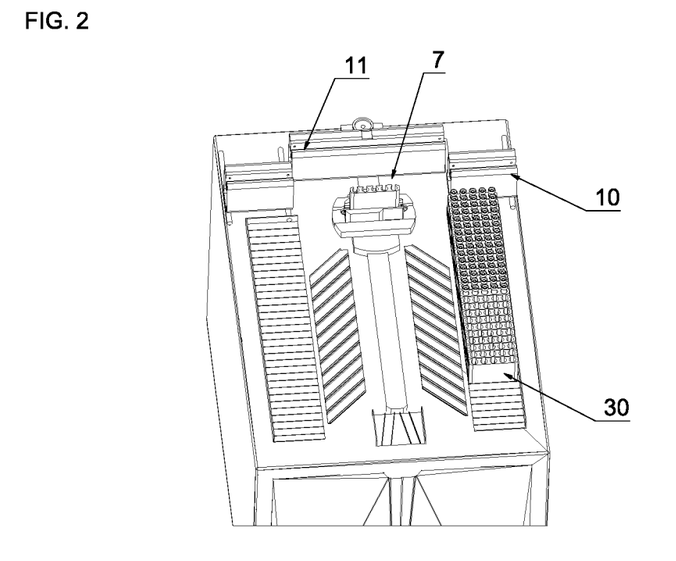
FIG. 2 shows all drives of. Terminal for loading and unloading.

The heart of the handling automation of the system is the distribution robot 7 with four linear drives (X-, Y-, Z-, hook-drive) and a rotational drive (theta-drive). It manages all movements of items between user interfaces for loading and unloading of racks 31 on trays 30, the system's internal positioning of items, interface drives as there are hosting/storing positions, interface drives to connected analyzers as well as external instrumentation and the scanner drive 11 to handle and position items for identification purposes (FIG. 2).

Figure 3:
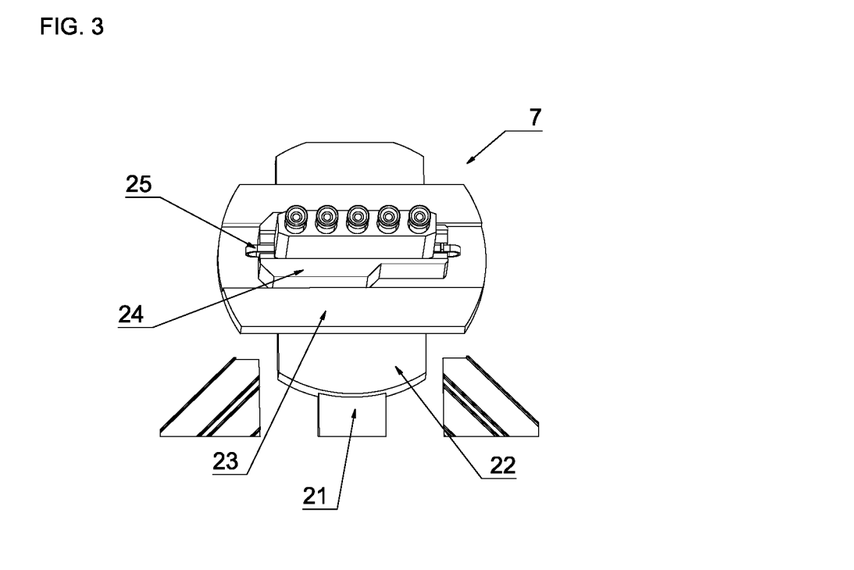
FIG. 3 shows the distributor robot

The distribution robot 7 comprises a rail 21 and four linear drives (X-, Y-, Z-, hook-drive) and a rotational drive (theta-drive) 20 to access items from different angular positions. Sledge 22 can only move linearly on rail 21. Platform 23 can rotate around sledge 22. Carrier 24 can move linearly on platform 23 and hook 25 can move linearly on carrier 24. For a vertical movement, platform 23 can lift over sledge 22 (FIG. 3). The Z-drive has only a very limited travel range of a few millimeters to adapt to vertical positional tolerances of subcomponents. It is not shown or explained in further detail in this description.

The functions of interface and scanner drives could also be performed by the robot itself. The described approach with separate drives allows for parallelization of processes and so for higher throughput.

Figure 4:
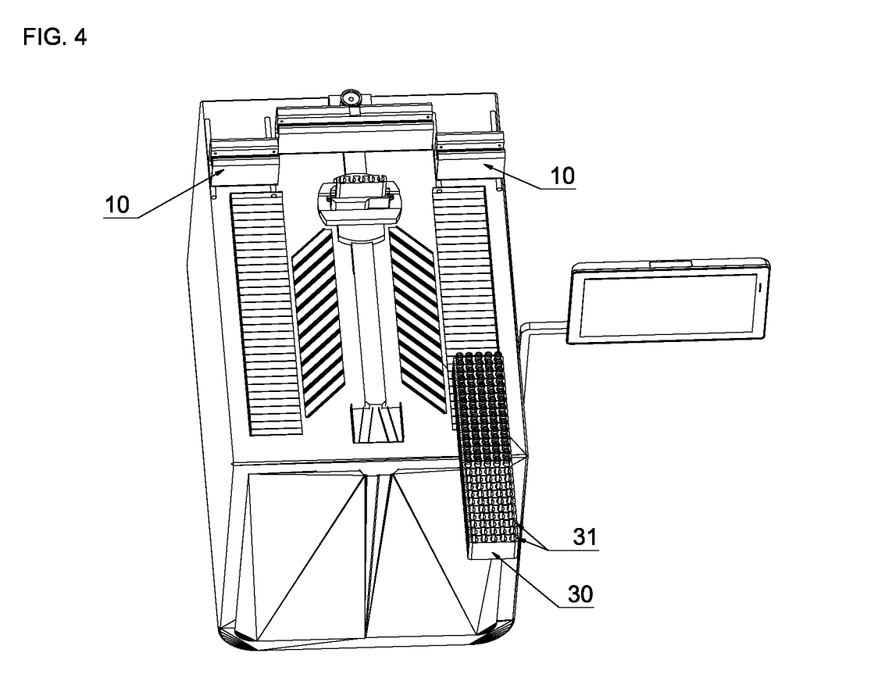
FIG. 4 shows a tray that allows for loading of 20 racks with 5 patient samples per rack, in total 100 patient samples.
Figure 5A:
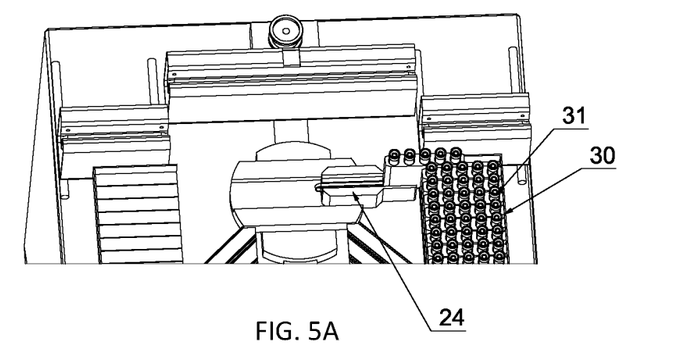
FIG. 5A shows how the distribution robot reaches out to a loading position and pulls a rack.
Figure 5B:
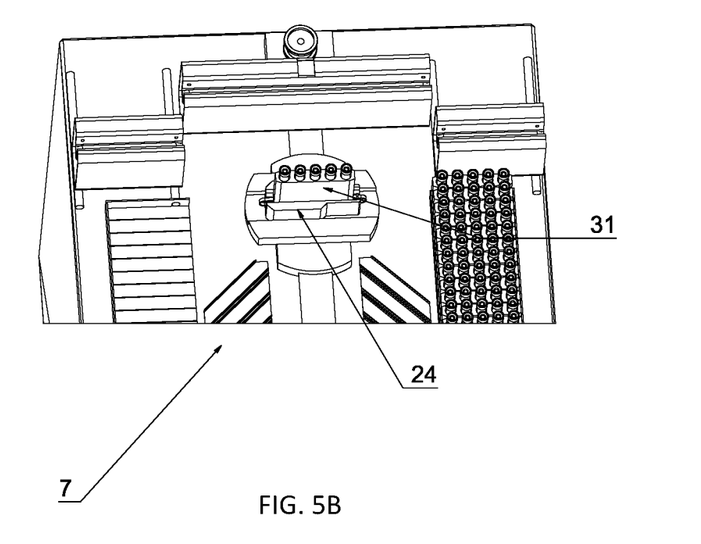
FIG. 5B shows an item/rack 'on board' the distribution robot

FIG. 4 shows a tray 30 that allows for loading of 20 racks 31 with 5 patient samples 35 per rack, in total 100 patient samples. The tray 30 can either be completely inserted into the system and a drive pulls racks 31 or items from the tray 30 as indicated by the arrow in FIG. 5A, or the tray is just placed manually onto the loading port and the user pushes items or racks 31 from the tray 30 into the loading port. FIG. 5B shows a rack 31 that has been pulled by the carrier 24 so that the distribution robot 7 can transfer it to a designated position. This is the item's position for the handling moves of the robot on the system FIG. 5A shows how the carrier 24 reaches out to a loading position and pulls a rack 31. In a similar way it can reach out to all other loading, unloading, interface and identification positions to hand over items.

Unloading of multiple items to a tray 30 works in reverse order as described for loading. A user is going to place an empty tray 30 into the system and an unloading drive pushes items or racks 31 back on the tray 30 or the user manually pushes items from the unloading area back 2 on the tray 30.

Figure 6A:
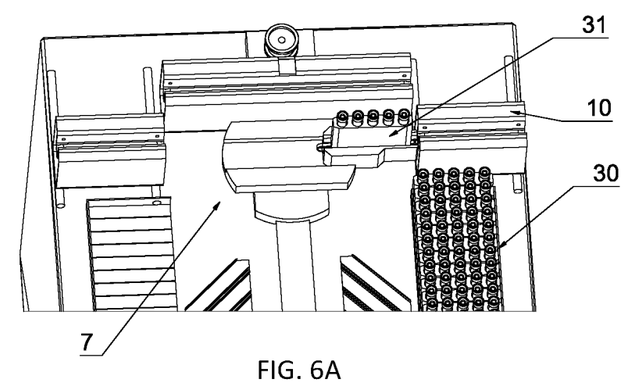
FIG. 6A shows how the distribution robot reaches out to one the interface drives.
Figure 6B:
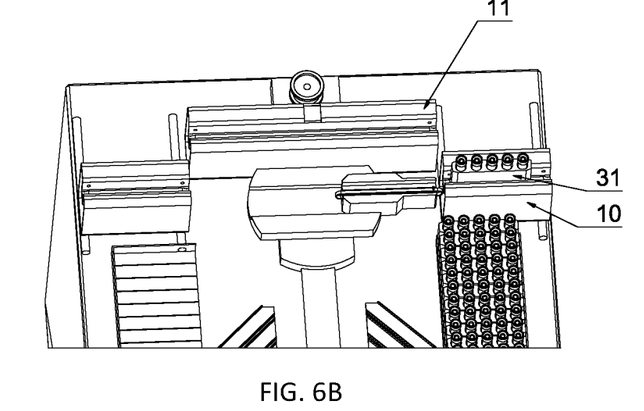
FIG. 6B sows an interface drive that has pulled-in the rack and moves it towards the scanner drive to hand-over the rack again.
Figure 7:
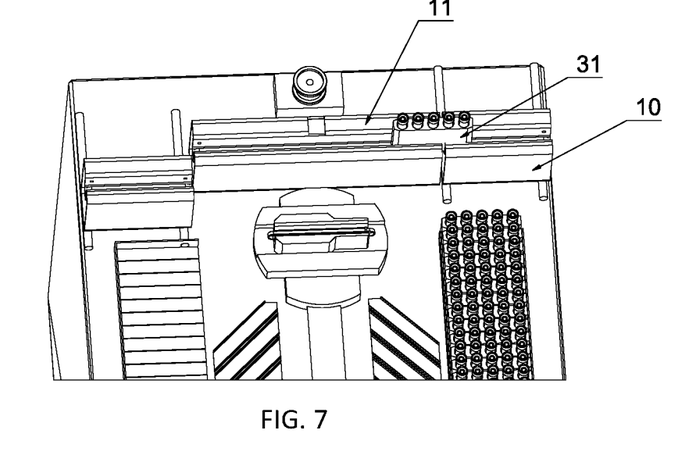
FIG. 7 shows how the interface drive hands over the rack to the scanner drive.

In FIG. 6A, the distribution robot 7 reaches out to one of the interface drives on the right side above the tray 30. In FIG. 6B, the interface drive 10 has pulled-in the rack 31 and moves towards the scanner drive 11 to hand-over the rack 31 again, there. In FIG. 7, the rack 30 is handed over from an interface drive 10 to scanner drive 11. Subsequently identification of the kind of item may start independently from the status of the other parts of the system (FIG. 7).

Figure 8:
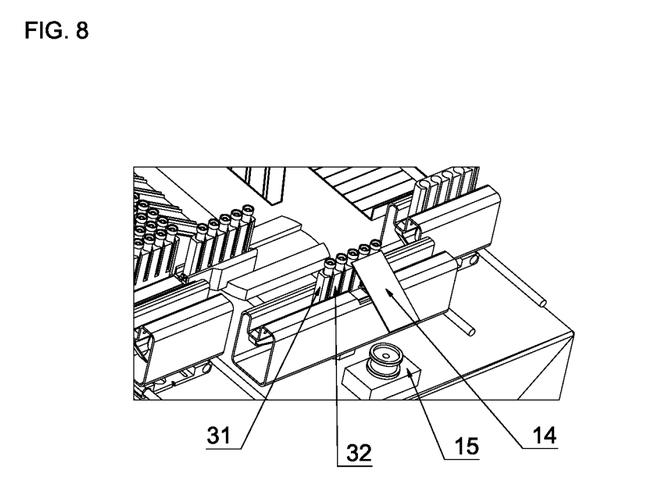
FIG. 8 shows a camera-based system that is acquiring information by. Reading them out from a label.

A camera-based system gets information about samples like the patient sample ID and further data about sample tube geometry and assigns this information to the sample rack 31 in which the tubes are carried through the system. The sample rack 31 has a built-in RFID tag 32 that allows for rack identification along all connected automated analyzers or cores prior to initializing appropriate pipetting steps. Identifying the rack 31 eliminates the need to regather all information about each tube and saves time without adding risk to the process FIG. 8 shows a camera is 15 that is combined with an image analysis software which identifies an item through a scanner beam which is reflected by a deflection mirror 14 so that it passes the camera's field of view. If the camera is unable to identify an item, it is an option to have a gripper system available for repositioning of the item to redo scanning from a different direction. If the item was only wrongly oriented, the ID will be read, and the item will be processed as intended. If no ID can be read on the item, it will not be processed, and the user will be given relevant information to perform necessary error recovery actions.

Figure 9:
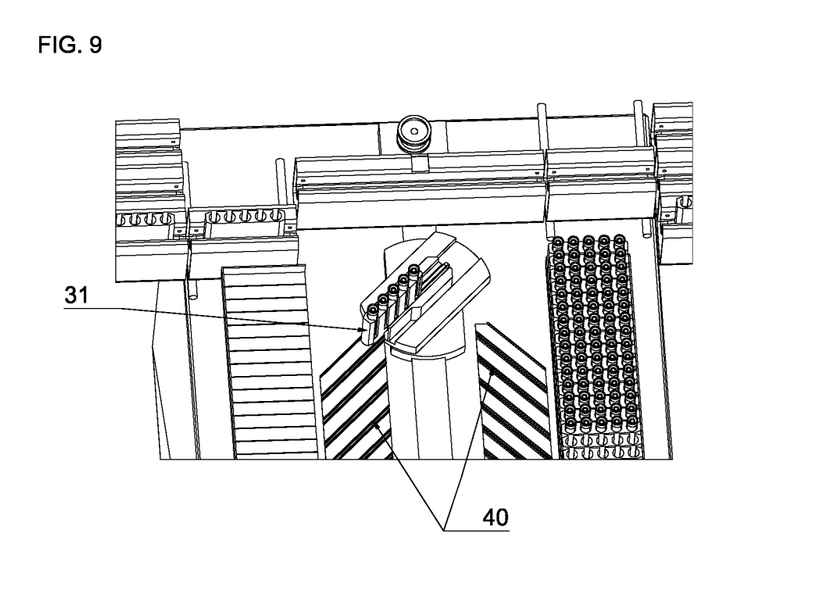
FIG. 9 shows storage and parking positions.

The system according to the present invention does provide parking or storage positions 40 for items as can be seen in FIG. 9. For patient samples this can be done after identification to have them available prior to sending them to the connected analyzers. In a second step, a patient sample on a rack 31 may come back from an analyzer waiting there for the test result and for a potential retest, depending on the initial result.

In a further aspect of the invention, the storage for reagents can be a cooled or non-cooled environment to accommodate them appropriately prior to transporting them to analyzers for specific assays or their processing. The storage for consumables may allow enough capacity for a longer ongoing use so that user interactions are minimized and a well-balanced distribution of consumables for all connected analyzers is certain.

Figure 10:
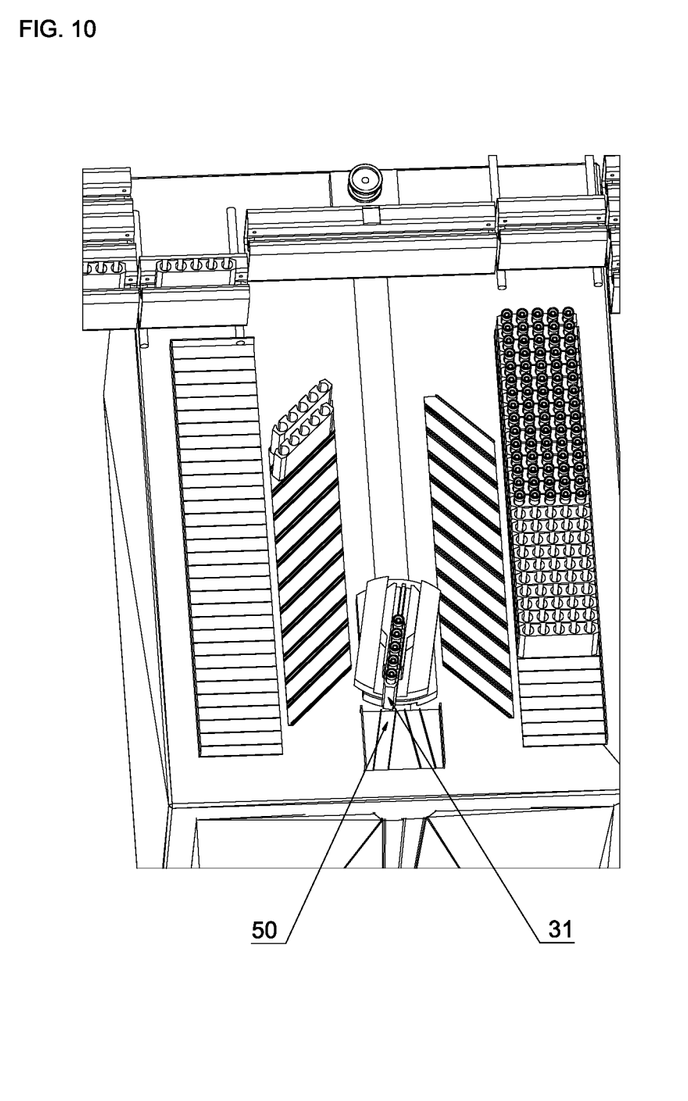
FIG. 10 shows loading and unloading ports for single items.

The system of the present invention does further comprise loading/unloading ports 50 for single racks 31 as shown in FIG. 10. Whether a position supports a) loading only, b) unloading only or c) loading and unloading is administrator or user configurable and can be chosen with respect to the most relevant use cases. The illustrated design allows for unrestricted user access to these ports.

As an alternative, user access can also be protected by covers to strictly separate and control user and machine interaction. A user then would need to request access via the graphical user interface on the monitor The illustrated example shows how the distribution robot 7 reaches out to the storage/parking positions 40. A typical use case in the context of sample handling would be that the test results of initial processing are available and in case of a necessary retest the robot would bring the samples back to an analyzer. In case that no retest is necessary, the samples could be handed over to an unloading area.

In the context of assay reagents management an assay reagent would be transported to the analyzer where the assay shall be performed.

The illustrated sequence shows how the distribution robot 7 reaches out to the loading/unloading port 50 and pushes a rack to it. The rack 31 or even multiple racks 3 can be handed over from that position to the user or can be manually loaded by a user without placing a rack 31 into a tray 30. Loading racks 31 through loading/unloading port 50 allows to process samples in-between or for storing them at storing/parking position 40 for a later processing. Loading/unloading port 50 provides an additional point of entry for racks 31, respectively samples.

The advantages of the present invention may be summarized as follows:
  The invention offers a strategy to supply a scalable solution of analyzer systems with patient samples, reagents, consumables and/or other bulk materials at a centralized point at defined conditions.

It reduces cost as it eliminates the need to design manufacture and service a complete family of solutions for different throughput needs.

It allows for an earlier time to market of a multi-analyzer-family solution due to limited efforts in design, manufacturing and verification/validation It reduces lab footprint and system installation effort for the same reason.

It increases reliability and reduces service and maintenance effort again for the same reason.

It supports improved flexibility to connect to existing LAS solutions with specific interface features.

It eases interfacing with other external components like rack builders, centrifuges or refrigerators.

Further embodiments to realize the invention may comprise at least one of the following

- More than one level can be used for loading, unloading, storage etc. to expand capacity of the terminal. The robot could access the different levels with an additional vertical axis.
- Different levels could be used to load, unload and store different items, e.g. top level for patient samples. $2^{nd}$ level below for reagents, $3^{rd}$ level below for consumables . . . .
- Items can be managed and handled directly and individually in the system or they can be handled by putting several items into e.g. racks (as described).
- Items and racks can be loaded/unloaded individually or multiples of them can be loaded/unloaded via trays or similar carriers.
- The infrastructure of zones, positions, interfaces, ports and drives can vary from the illustrated design in numbers, size, and layout.
- Certain areas of the module like storage could be temperature controlled.
- Means for identification of items can vary from the illustrated.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 loading/unloading area single items
2 loading/unloading area multiple items
5 user interface monitor
6 protective cover
7 distribution robot
10 interface drive to connected analyzer
11 scanner drive
14 deflection mirror
15 camera
21 rail
22 sledge
23 platform
24 carrier
25 hook
30 tray
31 rack
32 RFID tag
35 patient sample
40 parking/storage positions
50 loading/unloading ports

What is claimed is:

1. A system for loading, identifying and hosting samples and/or consumables to at least two automated analyzer systems, the system comprising at least one tray for accommodating racks for accommodating sample containers and a terminal for moving racks comprising a distribution robot with four linear drives and a rotational drive, wherein the terminal comprises:
   a sledge that can only move linearly and horizontally in a single direction is arranged onto a rail of a first linear drive which is arranged between two loading or unloading areas;
   a platform located on the sledge that can only rotate around the sledge and vertically move above the sledge is arranged horizontally onto the rotational drive;
   a carrier that can only move linearly and horizontally on the platform is connected to a second linear drive;
   a hook that can only move linearly and horizontally on the carrier is connected to a third linear drive; and
   a drive for vertically moving the platform above the sledge is connected to a fourth linear drive.

2. The system of claim 1, comprising a loading and unloading area for single and multiple items.

3. The system of claim 1, comprising at least one protective cover for covering movable parts.

4. The system of claim 1, comprising an input device and a display.

5. The system of claim 4, wherein the display is also the input device.

6. The system of claim 1, comprising storage positions for racks.

7. The system of claim 1, wherein the at least one tray has rows for accommodating racks in parallel.

8. The system of claim 7, wherein the at least one tray has up to 20 rows.

9. The system of claim 1, wherein a rack has recesses for accommodating up to five containers.

10. The system of claim 1, further comprising a scanner for reading labels or barcodes applied to a container and/or rack.

11. The system of claim 10, wherein the scanner is a camera.

12. The system of claim 1, comprising a storage for reagents.

13. The system of claim 12, wherein the storage is cooled.

* * * * *